July 29, 1969  SATOSHI ANDO ET AL  3,458,390
SPECIFIC CONJUGATE COMPOSITE FILAMENT
Filed Sept. 27, 1965  2 Sheets-Sheet 1
FIG. 1
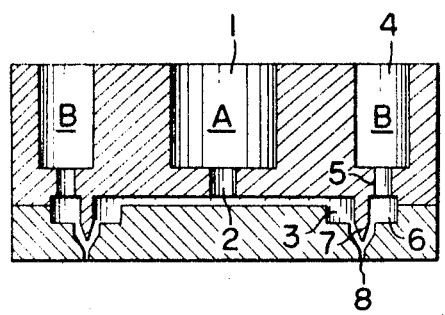
FIG. 2  FIG. 3  FIG. 4
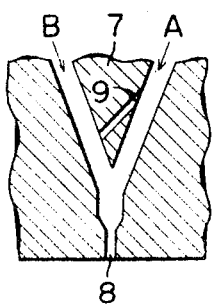 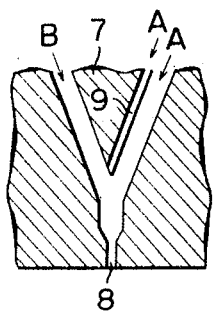 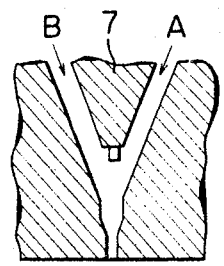
FIG. 5  FIG. 6  FIG. 7
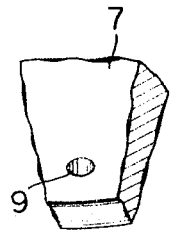 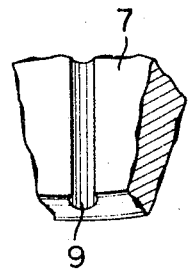 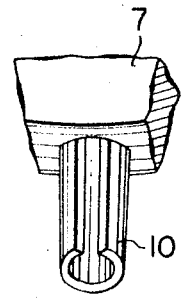

3,458,390
SPECIFIC CONJUGATE COMPOSITE FILAMENT
Satoshi Ando and Yusaku Tanaka, Osaka-shi, and Fumimaro Ogata, Nishinomiya-shi, Japan, assignor to Kanegafuchi Boseki Kabushiki Kaisha, Tsutsumi-dori, Sumida-ku, Tokyo, Japan
Filed Sept. 27, 1965, Ser. No. 490,448
Claims priority, application Japan, Sept. 26, 1964, 39/55,369; Jan. 29, 1965, 40/4,949
Int. Cl. D01f 7/04
U.S. Cl. 161—177       8 Claims

ABSTRACT OF THE DISCLOSURE

A conjugate composite filament is formed of two thermoplastic constituents, a part of each of the two constituents forming a part of the external periphery of the filament with at least one projecting portion of one of the constituents interengaged in the other constituent and having an enlarged end section and a reduced neck section thereby obtaining good coadhesive properties between the two constituents of the filament.

---

The present invention relates to a novel specific conjugate composite filament obtained by subjecting two thermoplastic fiber-forming polymeric constituents having poor co-adhesive properties to simultaneous conjugate-spinning in a manner such that both constituents are disposed side-by-side each other along the longitudinal axis of the filament and that said two constituents are not separable from each other by any subsequent treatment.

In order to manufacture a composite filament having its constituents disposed in side-by-side relationship with each other along the longitudinal axis of the filament, it was necessary in the past that each constituent had co-adhesive property. In the produution of a composite filament having its constituents disposed in side-by-side relationship to each other, therefore, the types of the constituents were limited to such fiber-forming polymers which were relatively similar to each other in their chemical compositions. For example, in the case where a polyamide was used for one of the constituents, a polyamide of somewhat different chemical composition had to be used for the other constituent. Polymers such as polyester which are of a chemical composition different from polyamides could not be used in many cases on account of their poor co-adhesive properties.

More specifically, when two or more polymers of poor co-adhesive properties were spun in side-by-side relationship in conjugate-spinning, they would tend to separate either partially or throughout the entire portions thereof by the mechanical stresses exerted upon the fiber in post-spinning treatments, and the resulting filament lacked the essential character of a composite filament.

Also, a composite filament formed of constituents having the same chemical groups had limited characteristics because of the resemblance of their chemical compositions.

It is an object of the present invention to provide a novel composite filament comprising two thermoplastic fiber-forming polymeric constituents having poor co-adhesive properties conjugated in a unitary filament in a continuous side-by-side relationship with each other along the longitudinal axis of the filament in a manner such that the constituents do not completely separate from each other by any subsequent treatment.

Another object of the present invention is to provide a composite filament having excellent crimpability, bulkiness, covering power, feel, and softness, which has been impossible to obtain from conventional composite filaments.

The novel specific conjugate composite filament of the present invention comprises two thermoplastic fiber-forming polymeric constituents of poor co-adhesive properties extending in adjacent side-by-side relationship along the entire length of the filament with a portion of each of the external peripheries of the constituents constituting respectively a portion of the periphery of said filament and the abutment line of both components in an arbitrary cross-section of said filament forming an interengaging or necking pattern wherein one of the components intrudes or is interengaged in the other component.

The filament according to the present invention, despite the fact that it is a product obtained by subjecting two or more fiber-forming polymers of poor co-adhesive properties to conjugate-spinning, never develops a substantial separation of the constituents when the filament is subjected to bending stresses and/or mechanical stresses in a number of treatments after spinning.

Furthermore, in view of the fact that polymers having considerably different chemico-physical structures can be used for the constituents of the filament of the present invention, if a filament formed with such polymers is crimped by any known method, the filament can possess an excellent bulkiness and covering property which have been impossible to obtain from conventional filaments, and in addition, the filament of the present invention can be made to possess unique characteristics which have not been preesnt in conventional composite filaments.

More specifically, by properly controlling the degree of the conjugative property of each constituent at the time of simultaneous conjugate-spinning through the same spinning orifice of two or more fiber-forming polymers having poor co-adhesive properties, or by separating a part of the conjugate plane of the constituents by imposing mechanical stresses on the filament during post-spinning treatment to an extent which does not cause substantial separation of the constituents, it is possible to produce a composite filament having excellent feel and softness, which is bulky and beautiful in appearance and which is also elastic, which has not been possible to obtain in conventional composite filaments.

A composite filament which does not substantially split into separate constituents as herein described, refers to a composite filament, the constituents of which are disposed in continuous side-by-side relationship with each other along the lengthwise (longitudinal axis) direction of the filament so that the constituents do not substantially separate from each other when they are pulled in any direction in a cross-section of the said filament within an extent which does not cause transformation of the constituents.

Such specific conjugate composite filament as described above can be manufactured effectively by using an improved spinneret of simple structure. The spinneret used in the present invention comprises a conventional spinneret of the type which is adapted to supply two molten thermoplastic fiber-forming polymers to the same spinning orifice separately by means of a partition wall so that the constituents will join together immediately before being spun, thereafter forming them into a single filament, characterized in that a conducting hole of the desired shape is bored through the partition wall either in a recessed form or in a projecting form near the tip of said partition wall.

Next, the specific composite filament and a spinneret for use in its manufacture according to the present invention, will be described in detail by reference to the drawings. These drawings are shown only to illustrate some of the embodiments of the present invention and it is to be understood that composite filaments of various modified types and spinnerets of various modified types for use in their manufacture, can be readily perceived without departing from the scope of the spirit of the present invention.

In the drawings:

FIGURE 1 is a vertical cross-sectional view showing an embodiment of the spinneret of the present invention;

FIGURES 2 through 4 are vertical cross-sectional views, on an enlarged scale, of the portion of the partition wall of the spinneret in FIG. 1;

FIGURES 5 through 7 are partial perspective views on an enlarged scale, showing the tip patterns of the partition walls of FIGS. 2 through FIG. 4, respectively.

Figure 8:
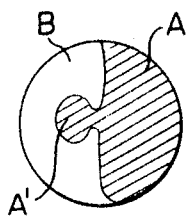
FIGURES 8 through 18 are cross-sectional views showing some of the embodiments of the specific conjugate composite filament of the present invention.

In FIG. 1, a polymeric constituent A is supplied from a supply chamber 1 through a conducting pipe 2, and another constituent B is supplied from a supply chamber 4 through a conducting pipe 5, respectively, into annular grooves 3 and 6. Thereafter, the polymeric constituents A and B flow downwards from said annular grooves along the partition wall 7, and they are conjugated at the end portion of the partition wall, and the conjugated polymers are extruded under pressure through a spinning orifice 8. Thus, a composite filament having two polymeric constituents disposed in side-by-side parallel relationship with each other is formed.

FIG. 2, FIG. 3 and FIG. 4 are longitudinal cross-sections on an enlarged scale of the partition wall in FIG. 1 of important portions of the spinneret of the present invention. FIG. 2 illustrates a conducting hole 9 bored through the partition wall for partly conjugating the constituent A with the constituent B, after which the constituents are completely conjugated. A part of the constituent A, fed through the annular groove, passes through the said conducting hole and joins the constituent B, while constituent B thus conjugated with a part of constituent A, is again conjugated with the remainder of constituent A at the end portion of the partition wall. The cross-section of the outlet of the said conducting hole can have any selected configuration and dimensions. For example, in the case where the cross-section assumes a circular configuration as shown in FIG. 5, in which the cross-section is shown in an enlarged perspective view, a composite filament having a protruding pattern A′ in a circular cross-section of the filament as shown in FIG. 8 is obtained. If the outlet of the conducting hole 9 has a cross-section of a larger size, the protruding pattern A′ will accordingly assume a larger size, and as a result, constituents A and B, having poor co-adhesive properties, are securely conjugated. Also, if the outlet of the conducting hole 9 is disposed closer to the end portion of the partition wall, the conjugate pattern will become sharper. In the case where two conducting holes are provided through the partition wall in parallel relationship with each other, the resulting composite filament will have two protrusions of circular shape, such as the cross-section shown in FIG. 9. The conjugating strength of this filament is greater than that of the filament shown in FIG. 8.

Figure 10:
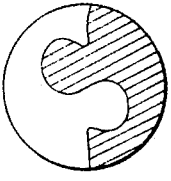
Figure 11:
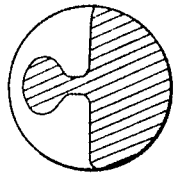
Figure 12:
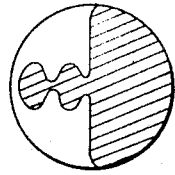

Also, if two conducting holes are disposed in intersecting relationship with respect to the longitudinal cross-section of the partition wall, the resulting filament will have a cross-section as shown in FIG. 10. If the outlet of the conducting hole 9 is provided so that it projects into the path of the constituent B, or if the extrusion pressure of constituent A is greater than that of the constituent B, the resulting filament will have a conjugate pattern as shown in FIG. 11, where a portion of the conjugate plane intrudes or projects into constituent B. Also, the conjugate pattern of FIG. 12 can be easily formed by combining the pattern of FIG. 8 with that of FIG. 11.

Figure 13:
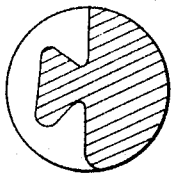
Figure 14:
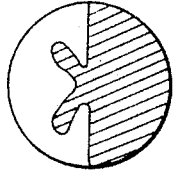
Figure 15:
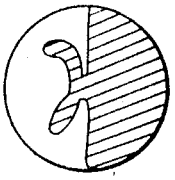
Figure 16:
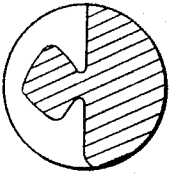

Also, if the outlet of the hole is given various modified cross-sections other than a circular cross-section, composite filaments having cross-sections such as those shown in FIG. 13 through to FIG. 16 can be obtained. In all cases through, it will be seen that a portion of one constituent intrudes or projects into the other constituent and forms at least one necked-down portion therein.

Thus, as seen in FIGS. 8–16, the portions of the constituents which project into the other constituents have an enlarged remote end which is joined to the rest of the constituent by a narrow necked-down portion. This insures the interengagement or conjugation of the constituents.

The partition wall shown in FIG. 3 is an example where the conducting hole 9, bored through the partition wall, is in parallel relationship with respect to the surface of the partition wall on the side of constituent A. Such arrangement produces results identical with the partition wall shown in FIG. 3.

FIG. 6 is a perspective view of the partition wall wherein the conducting hole is of a circular cross-section.

FIG. 4 illustrates the partition wall in which a protrusion of suitable configuration and size is provided at the end portion of the wall. In the arrangement shown in this FIG. 4, composite filaments of various conjugate patterns are obtained by passing, through the said protruding conducting hole, either one of the constituents A or B which are fed from the annular groove. A sharper conjugate pattern will be obtained if the protruding conducting hole is disposed eccentrically relative to the tip of the partition wall, or if the quantities of the constituents A and B to be supplied therethrough and through the annular grooves are varied.

FIG. 7 illustrates an example where the end portion of the partition wall in FIG. 4 is a tubular shaped protrusion having a slit or notch. When conjugate-spinning is conducted with this spinneret, a part of constituent A enters into the tubular shaped protrusion through the notch therein, and thereafter joins constituent B at the end of the tubular shaped protrusion, whereby a composite filament having a cross-section as shown in FIG. 8 is obtained. FIG. 7 is a typical embodiment of the shape of the projection in FIG. 4. Protruding conducting portions and holes of various shape may be readily conceived.

In using the spinneret of the present invention, the conjugation patterns can be partially altered by appropriately changing the quantities of the constituents to be extruded, the viscosity, the pressure, the flow direction, the conjugation angle, and the like, of the respective constituents.

Figure 17:
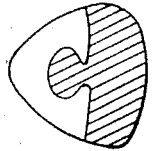
Figure 18:
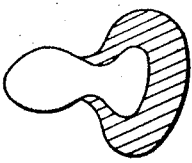

Also, the spinning orifice which is used in the apparatus of the present invention need not always have a circular cross-section, but it may be of modified configurations. FIG. 17 and FIG. 18 show examples of composite filaments obtained by the use of spinning orifices of modified configurations. A composite filament having such modified cross-sections as these, for example, presents superior elasticity, warm feel and silk-like lustre as compared with those of a filament having a circular cross-section.

The composite filament of the present invention may be manufactured by adding thereto such agents as a delustering agent, a coloring matter stabilizer, a filler and so forth.

The polymeric constituents of poor co-adhesive properties, which are used in a pair in the present invention, can be fiber-forming polymers of various types. However, the polymers particularly effective for the present invention include, for example, polyamides, polysulfonamides, polyesters, polyurethanes, polyureas, polyolefins, polyvinylchlorides, polyvinylidene chlorides and polyvinyl alcohols.

The specific conjugate composite filament of the present invention which is produced by the use of two or more fiber-forming polymers with poor co-adhesive properties, which has been heretofore difficult to manufacture, presents excellent bulkiness, marked elasticity, pleasant touch and soft feel by developing crimps by any conventional method. In view of such advantages, the filament produced according to the present invention can be effectively used for various textiles, knitted fabrics, and also for piles of carpets. Furthermore, the filament of the present invention may be used not only in the form of a continuous filament, but also in the form of staple fibers.

Some of the examples of the present invention will be described hereinafter. The inherent viscosity which is used in the description of the following examples was obtained in the following manner:

$$\text{Inherent viscosity} = \frac{\ln \eta r \theta l}{C}$$

wherein, $\eta r \theta l$ represents, in the case of polyamide, the relative viscosity of the solution prepared by resolving 0.6 g. of polyamide in 100 cc. of m-cresol (C=0.6 g./100 cc.) at 30° C. In the case of polyester, it represents the relative viscosity of the solution consisting of phenol (C=0.2 g./100 cc.) and tetrachloroethane mixed at the ratio of 60:40 by weight and determined at 20° C. In the case of polyethylene, it represents the relative viscosity of the Tetralin solution of C=0.5 g./100 cc. determined at 120° C.

EXAMPLE 1

Polyhexamethylene-adipamide (constituent A) having an inherent viscosity of 1.03 and polyethylene-terephthalate having an inherent viscosity of 0.68 (constituent B) were subjected to melt-conjugate spinning with a conjugation ratio of 1.2:1 at a temperature of 290° C. by using a spinneret having a circular cross-section of the conducting hole in the partition wall as shown in FIG. 2. The obtained undrawn composite filament was then drawn on a heated snubbing pin at 80° C. to 3.2 times the original length and a filament of 15 denier was obtained. Microscopic examination of the cross-section of said filament showed a conjugation pattern as shown in FIG. 8.

Also, microscopic examination of the cross-section of the composite filament which was spun through a spinneret having a conventional partition wall and under the same other conditions as described above showed that the conjugate plane of polyhexamethylene-adipamide and polyethylene-terephthalate formed an almost straight line without any intruding pattern of the present invention.

By bending these two types of drawn composite filaments, it was noted that the one which had a conventional conjugated pattern separated into two constituents for the most of the length of the filament and that the composite filament according to the present invention was entirely intact.

The said composite filament of the present invention was then immersed in boiling water for 15 minutes without load to develop crimps. The characteristics of the crimps were determined and the result is shown in Table 1.

Table 1

| | |
|---|---|
| Shrinking rate _____percent__ | 91.3 |
| De-crimping force _____mg./denier__ | 8.4 |
| Number of crimps per 1 cm. _____ | 23 |

The term "de-crimping force" as referred to in the above table, as well as in the tables in the following examples, refers to a load (expressed in mg. per denier) for imparting to a filament a tension just sufficient for removing only the crimps of said filament without developing the inherent elasticity of said filament.

EXAMPLE 2

The two polymers used in Example 1 were subjected to melt-conjugate spinning at a conjugation ratio of 3:2 and at 290° C., using a spinneret having a partition wall provided with two conducting holes bored in parallel relation with the wall surface and having circular cross-sections. The obtained undrawn composite filament was drawn in the same manner as in Example 1 and a filament of 15 denier was obtained.

Figure 9:
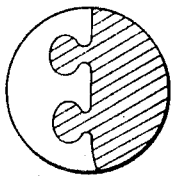

Microscopic examination of the said filament showed a conjugation pattern as shown in FIG. 9.

The said drawn filament was immersed in boiling water for 15 minutes without load, and the specimen which had thus developed crimps was subjected to a load of 1 g./denier for 5 minutes, and thereafter the load was removed and the filament was left to stand as is for five minutes. After repeating these procedures 10 times, the cross-section of the filament was again examined microscopically. There was no conjugate plane that had separated into two constituents.

Similar procedures were effected for the filament obtained according to the present invention in Example 1, and although no complete separation of the two constituents was found, there was a partial separation in the conjugate plane.

EXAMPLE 3

Polycapramide (constituent A) having an inherent viscosity of 1.12 and polyethylene (constituent B) having an inherent viscosity of 0.88 were subjected to melt-conjugate spinning at a conjugation ratio of 1.2:1 and at 270° C. using a spinneret with a triangular projecting conducting hole at the tip of the partition wall as shown in FIG. 4 and in a manner that the two constituents were disposed in parallel side-by-side relation with each other. The obtained undrawn filament was subjected to cold drawing to 4.8 times the original length and a filament of 15 denier was obtained. Microscopic examination of the cross-section of said filament showed a conjugate pattern as shown in FIG. 13.

This filament was immersed in boiling water for 15 minutes without load to develop crimps. Thereafter, the crimp characteristics were determined and the result is shown in Table 2.

Table 2

| | |
|---|---|
| Shrinking rate _____percent__ | 88 |
| De-crimping force _____mg./denier__ | 7.4 |
| Number of crimps per 1 cm. _____ | 17.2 |

The above crimped composite filament was compressed and then un-compressed, and then again compressed and un-compressed. This stress by compression was repeated several times. Thereafter, the cross-section of the filament was microscopically examined and it was noted that the conjugate plane on the external periphery was separated into two components but that the central portion was still conjugated. This partially separated filament was more bulky and more lustrous than the same filament examined before developing such separation.

EXAMPLE 4

Polyhexamethylene-adipamide having an inherent viscosity of 1.01 (constituent A) and polyethylene-terephthalate having an inherent viscosity of 0.65 (constituent B) were subjected to conjugate-spinning at a conjugation ratio of 1:1 and at 290° C. by using a spinneret having a partition wall with a prejecting conducting hole as shown in FIG. 4. An undrawn composite filament having a conjugate pattern as shown in FIG. 8 was obtained.

The said undrawn composite filament was drawn to 3.4 times the original length at room temperature, and the resulting filament was examined for its characteristics of crimps by the same method as used in Example 3, and the result is shown in Table 3.

Table 3

| | |
|---|---|
| Crimping rate _____percent__ | 74.2 |
| De-crimping force _____mg./denier__ | 4.3 |
| Number of crimps per 1 cm. _____ | 14 |

The said drawn filament was subjected to heat setting for 30 minutes at 110° C., and the crimping characteristics after this treatment is shown in Table 4.

Table 4

| | | |
|---|---|---|
| Crimping rate | percent | 93.2 |
| De-crimping force | mg./denier | 24.8 |
| Number of crimps per 1 cm. | | 34.1 |

EXAMPLE 5

Polyhexamethylene-sebacamide having an inherent viscosity of 1.05 (constituent A) and polyethylene-terephthalate having an inhesent viscosity of 0.68 (constituent B) were subjected to melt-conjugate spinning by using a spinning oriffice of triangular cross-section in a similar manner to that used in Example 1. The obtained undrawn composite filament was drawn on a heated snubbing pin at 80° C. to 3.2 times its original length and a filament of 15 denier was obtained.

By microscopic examination of the cross-section of the said drawn filament, a composite filament having a modified cross-section as shown in FIG. 17 was noted.

The said filament was immersed in boiling water for 15 minutes without load to develop crimps, and thereafter the characteristics of the crimps were determined and the result is shown in Table 5.

Table 5

| | | |
|---|---|---|
| Crimping rate | percent | 92.5 |
| De-crimping force | mg./denier | 23.9 |
| Number of crimps per 1 cm. | | 24.5 |

The said crimp composite filament presented a pleasant feel, softness, silk-like lustre, and also good elasticity.

What is claimed is:

1. A conjugate composite filament comprising two thermoplastic fiber-forming polymeric constituents of poor co-adhesive properties extending adjacently along the entire length of a single filament, a part of each of said two constituents constituting a part of the external periphery of said filament and in which one of said constituents includes at least one projecting portion interengaged in the other constituent, said at least one projecting portion including a remote enlarged end section and a reduced neck section joining said end section to the remainder of said one constituent to form at least one necked-down portion therein.

2. A conjugate composite filament as claimed in claim 1, wherein the two constituents are respectively a polyamide and a polyester.

3. A conjugate composite filament as claimed in claim 1, wherein the two constituents are respectively a polyhydrocarbon and a polyamide.

4. A conjugate composite filament as cliamed in claim 1, wherein the two constituents are respectively a polyhydrocarbon and a polyester.

5. A conjugate filament as claimed in claim 1, wherein the conjugate plane of the two constituents forming said filament is partially separated.

6. A conjugate composite filament as claimed in claim 1 and further comprising a delustering agent, a coloring matter stabilizer and a filler.

7. A conjugate composite filament as claimed in claim 1 and having a substantially circular cross-section.

8. A conjugate composite filament as claimed in claim 1 and having a substantially non-circular cross-section.

References Cited

UNITED STATES PATENTS

| | | | |
|---|---|---|---|
| 2,517,694 | 8/1950 | Merion et al. | 161—177 |
| 3,017,686 | 1/1962 | Breen | 28—82 |
| 3,039,173 | 6/1962 | Mehler et al. | 161—173 |
| 3,111,805 | 11/1963 | Boyer | 264—171 |
| 3,320,633 | 5/1967 | Cancio et al. | |

ROBERT F. BURNETT, Primary Examiner

J. D. FOSTER, Assistant Examiner

U.S. Cl. X.R.

57—140; 161—173; 264—171